US007060896B2

(12) United States Patent
Olle Miquel et al.

(10) Patent No.: US 7,060,896 B2
(45) Date of Patent: Jun. 13, 2006

(54) SOUND AND VIBRATION DAMPER IN A MOTOR VEHICLE ELECTRICAL DISTRIBUTION BOX

(75) Inventors: Jordi Olle Miquel, Valls (ES); Ignaci Ferran Palau, Valls (ES)

(73) Assignee: Lear Corporation, Southfield, MI (US)

( * ) Notice: Subject to any disclaimer, the term of this patent is extended or adjusted under 35 U.S.C. 154(b) by 83 days.

(21) Appl. No.: 10/709,685

(22) Filed: May 22, 2004

(65) Prior Publication Data

US 2004/0203279 A1    Oct. 14, 2004

(30) Foreign Application Priority Data

Dec. 20, 2002    (WO) ...................... PCT/ES02/00614

(51) Int. Cl.
 *H02G 3/08* (2006.01)
(52) U.S. Cl. ...................... 174/52.5; 174/52.1; 174/50
(58) Field of Classification Search ............... 174/52.1, 174/52.5, 50
 See application file for complete search history.

(56) References Cited

U.S. PATENT DOCUMENTS 5,214,245 A * 5/1993 Bernhardt et al. .......... 174/52.1
6,337,438 B1 * 1/2002 Oyamada .................... 174/52.1

* cited by examiner

*Primary Examiner*—Hung V. Ngo
(74) *Attorney, Agent, or Firm*—Bruce E Harang

(57) ABSTRACT

The invention relates to an improved sound and vibration device in a motor vehicle electrical distribution box. The inventive device comprises a structure for anchoring the structural elements of the aforementioned distribution boxes in such a way as to eliminate any possible sound or vibrations that may be generated as a result of the movement to which said motor vehicle elements are subjected.

1 Claim, 2 Drawing Sheets

SOUND AND VIBRATION DAMPER IN A MOTOR VEHICLE ELECTRICAL DISTRIBUTION BOX

BACKGROUND OF INVENTION

This invention, an improved sound and vibration device in a motor vehicle electrical distribution box, consists on a new and original anchorage structure of the structural elements of the referred distribution boxes, in such way that the possible generation of noise and vibrations, due to the movements to which these elements are submitted in motor vehicles, is eliminated.

For these reasons, this invention will be generally of particular interest to the manufacturing and distribution of equipment and accessories sector in the motor vehicle industry, since this device can be incorporated to electrical distribution boxes used.

The problem solved by this invention, meaning a technical advance, refers to the problems derived from the anchorage to an automobile, in an efficient manner, avoiding bothering and harmful noises and vibrations caused by the types of roads and highways where automobiles circulate.

Classic devices, defining the current state of the art, that guarantee good anchorage, thus guaranteeing the absence of noise generation, use a number of screws (mechanical fixation) as anchorage elements, being the same conveniently distributed along the box or device to close or to anchor. These systems show many serious inconveniences during the manufacturing of automobiles because they require high manufacturing times in assembly lines since they are bothersome closing mechanisms.

On the other hand, weight is also an ever more important factor taken into account by the automobile industry, where a reduction in the weight of the components that make up the structure of vehicles is looked for. In this sense, this invention also represents an advance with respect to traditional anchorage devices, by eliminating heavy weight metallic mechanisms, nuts and screws mainly, achieving not only simplifying the anchorage mechanisms but also a reduction of their weight.

Given all this, the invention described next refers to a device that at first simplifies the classic way of anchoring the different elements in an electrical distribution box, used by the automobile sector. In the classic way of anchoring, the assembly process consisted on placing the electric distribution box over the support and then screwing one by one the different screws, normally three or four, so that the box would remain fully attached to the support and free from generating vibrations and noise due to the movement of the vehicle during its displacement.

Therefore, this improved sound and vibration device in a motor vehicle electrical distribution box, comprises an oscillating box equipped with two cylindrical tilting pivots, aligned between them along the same axis perpendicularly to the sides of the box where said pivots are placed. These are also associated to two cams placed at the extremes of the pivots, transversally to the pivots. In the same way the device is equipped with two anchorage legs that can be attached to the vehicle by means of fast-attachment screws located on the opposite side of the box. Finally, the device is completed with two wings placed on the anchorage support.

In this invention, the box is assembled on support guides, remaining suspended by the tilting pivots designed for that purpose. In this way, the box oscillates freely since the cam is outside the action radius of the wings placed on the support. In order to anchor the box, it is necessary to turn it until the anchorage legs rest on the supports placed on the other support. Thus, the box rotates freely a few degrees before it comes to a stop. At this moment the cams associated to the tilting pivots begin to work by exerting pressure on the wings placed on the anchorage support. This pressure is the one that fixes the box by that side avoiding the generation of any noise vibration while the automobile is in motion. On the opposite side, the box is anchored by screws, reducing to half the number of screws used with the described device.

Next, we will provide a detailed description of the improved sound and vibration device in a motor vehicle electrical distribution box, with reference to the accompanying figures, which show, a non-exclusive, preferred embodiment. This embodiment may be adapted to all detail variations that do not presuppose a fundamental alteration of the essential characteristics of these advances.

DETAILED DESCRIPTION

Figure 1:
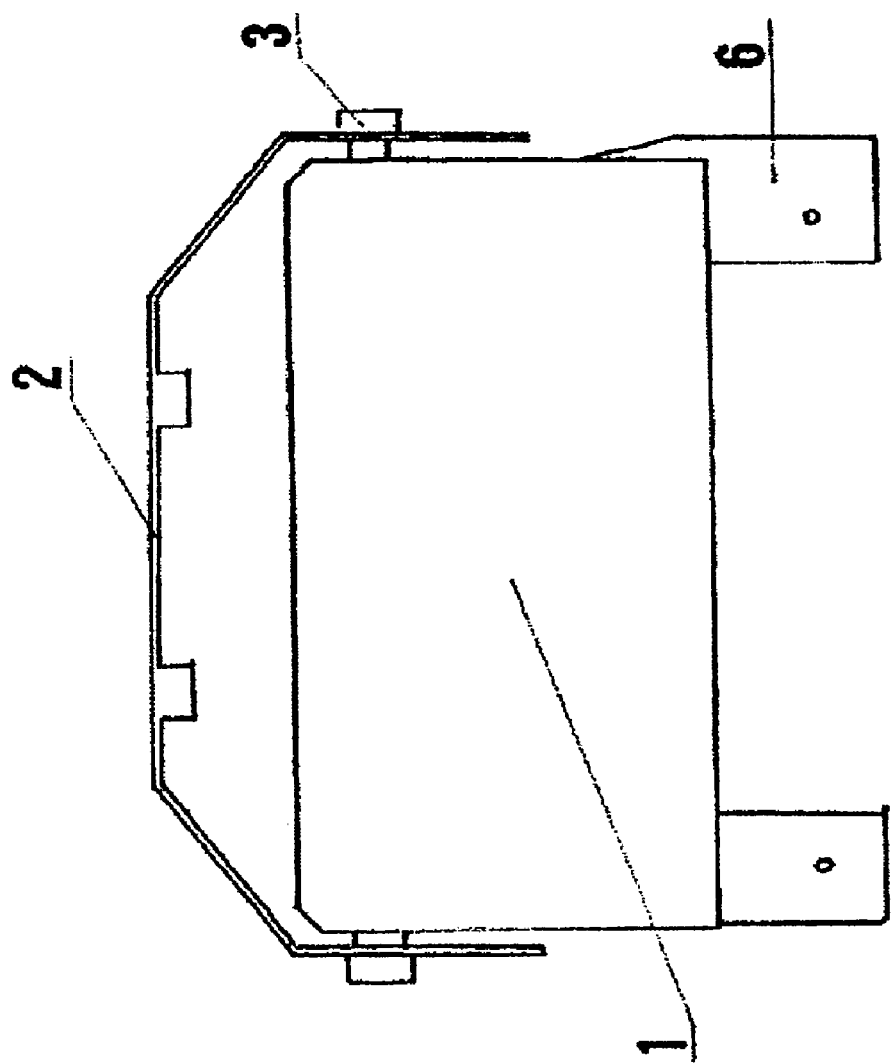
FIG. 1: View of the advanced device for noise and vibrations elimination in the electrical distribution box of automobiles.
Figure 2:
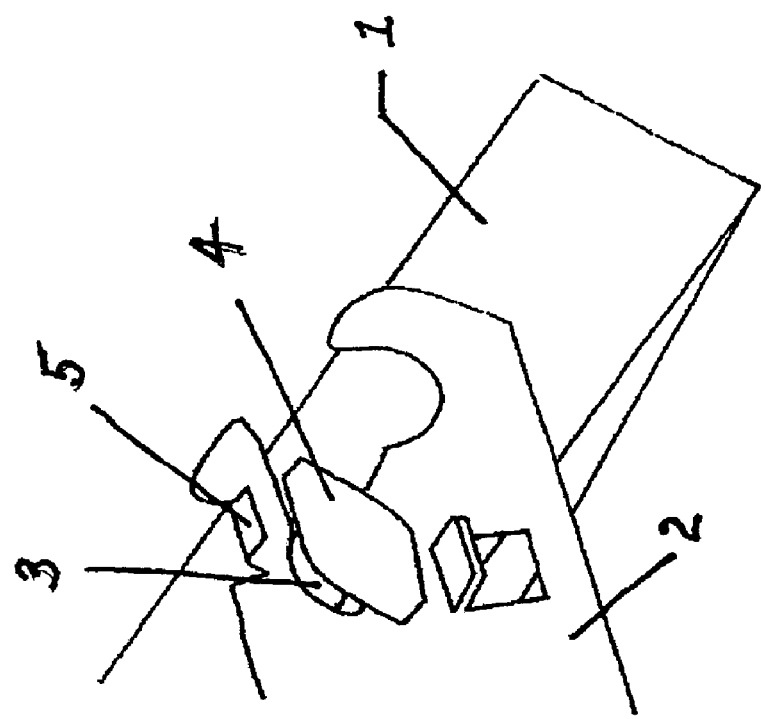
FIG. 2: Detailed view of the location of the pivots" cams free from the support wings.
Figure 3:
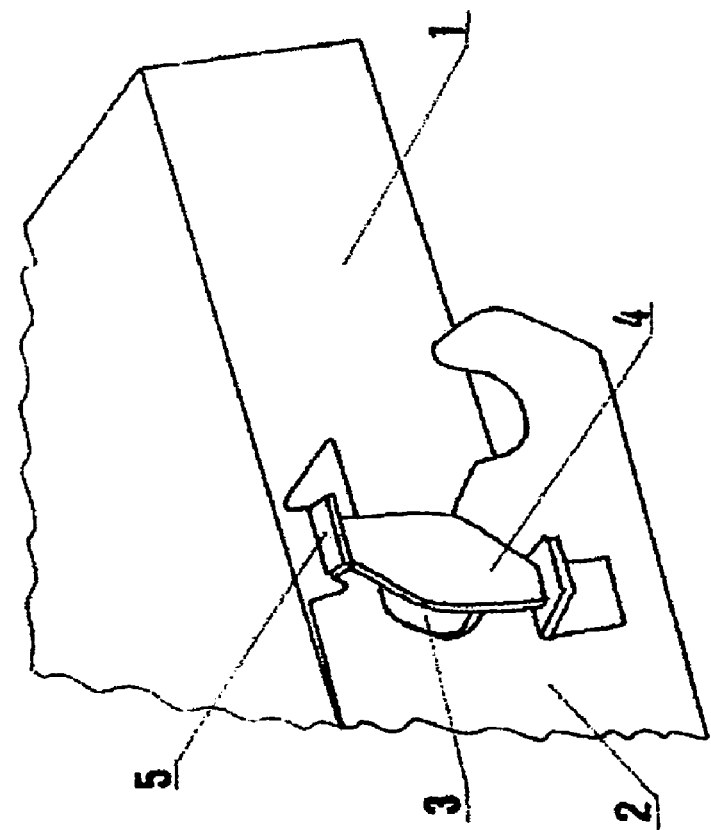
FIG. 3: Detailed view of the location of the cams pressure fitted between the support wings.

In accordance with the preferred embodiment shown, the device is constituted by the creation of a new and original structure of the frame of the referred electric distribution box, composed by an anchorage mechanism that exerts pressure on the box (1); this mechanism has a support (2) and two anchor legs (6), which can be anchored to the vehicle by means of screws. In the described device, the structure of the distribution box previously referred, is equipped with two tilting pivots (3) that are transversal to the lateral walls of the box, ended with cams (4); while the mentioned support (2) is equipped with guides dimensioned to receive the tilting pivots (3) and to pressure fit the cams (4) in wings (5) provided in the aforementioned support guides (2).

Finally, the shape, materials and dimensions and in general, all accessories and secondary elements that do not alter, change or modify the essential described advances can be modified.

The invention claimed is:

1. Improved sound and vibration device in a motor vehicle electrical distribution box for use in a motor vehicle comprising a frame structure of the distribution box (1), having four lateral walls, a bottom and a top; and a pressure fixing mechanism equipped with a support (2) and two anchor legs (6), which can be anchored to said motor vehicle by means of screws, said electrical distribution box being equipped with two tilting pivots (3) that are transversal to said lateral walls of said electrical distribution box, said two tilting pivots (3) ending in cams (4); support (2) being equipped with guides dimensioned to receive said tilting pivots (3) and to pressure fit said cams (4) in wings (5) located in said support guides (2).

* * * * *